United States Patent [19]

Moseley et al.

[11] Patent Number: 4,508,147

[45] Date of Patent: Apr. 2, 1985

[54] METHOD OF MANUFACTURING A POSITIVE ELECTRODE FOR A LEAD ACID ELECTRIC STORAGE CELL

[75] Inventors: Patrick T. Moseley, Chilton; Michael R. H. Hill, Wantage, both of England

[73] Assignee: United Kingdom Atomic Energy Authority, London, England

[21] Appl. No.: 477,777

[22] Filed: Mar. 22, 1983

[30] Foreign Application Priority Data

Mar. 22, 1982 [GB] United Kingdom ............... 8208326

[51] Int. Cl.³ .......................................... H01M 4/38
[52] U.S. Cl. ................................. 141/1.1; 29/623.5; 429/225; 136/265
[58] Field of Search .................. 141/1.1, 32, 33; 29/623.1, 623.2, 623.3, 623.4, 623.5, 2; 429/225, 226, 227, 228, 232; 204/2.1; 136/252, 263, 265

[56] References Cited

U.S. PATENT DOCUMENTS 421,075  11/1872  Zinchenko .......................... 141/1.1

FOREIGN PATENT DOCUMENTS 1476550  6/1977  United Kingdom .
2023558A  6/1979  United Kingdom .

Primary Examiner—Houston S. Bell, Jr.
Attorney, Agent, or Firm—Larson and Taylor

[57] ABSTRACT

The positive electrode for a lead acid electric storage cell is made by preparing by a chemical route particulate beta lead dioxide, mixing together the beta lead dioxide with a relatively low proportion of a binder, and applying the mixture to a perforated electrically conductive support structure.

9 Claims, 3 Drawing Figures

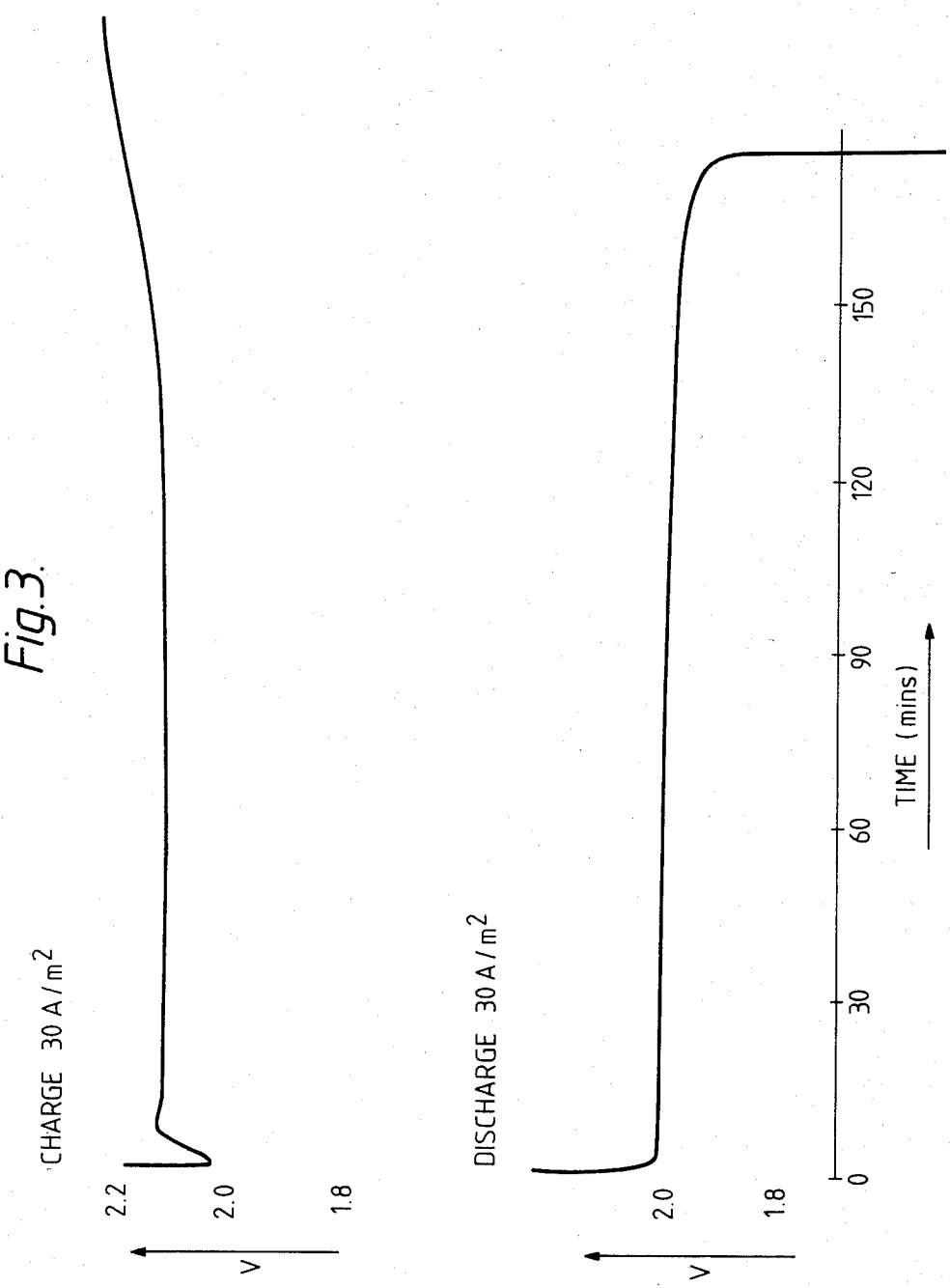

METHOD OF MANUFACTURING A POSITIVE ELECTRODE FOR A LEAD ACID ELECTRIC STORAGE CELL

BACKGROUND OF THE INVENTION

This invention relates to lead acid electric storage cells, and more particularly to a method of manufacturing a positive electrode for a lead acid electric storage cell.

In a well known method of manufacturing a positive electrode for a lead acid electric storage cell, lead monoxide is mixed with water and sulpuric acid to form an active mass which is then pressed into a lead grid. The grid with the active mass is subsequently held in an environment of controlled humidity for 2-3 days—the "curing" process, and then subjected to a low charging current for a further 2-3 days to convert the active mass electrochemically to lead dioxide—the "formation" process. This known method is time consuming and relatively costly, and thus the invention is concerned with providing an alternative, much shorter method of manufacturing the positive electrode.

FEATURES AND ASPECTS OF THE INVENTION

According to the present invention, a method of manufacturing a positive electrode for a lead acid electric storage cell comprises, chemically preparing particulate material comprising beta lead dioxide, mixing the beta lead dioxide with a relatively low proportion of a binder, and applying the mixture to a perforated electrically conductive support structure.

Preferably, the binder comprises polytetrafluorethylene (PTFE), desirably, in the proportion of about 0.2% by weight of PTFE, and the PTFE and the beta lead dioxide may be ground together to form a fibrillated mass thereof.

Advantageously, the positive electrode is subjected to an initial relatively short electric charge, to improve the electrical capacity of said positive electrode.

It will be understood that the invention includes a positive electrode made by the method of the invention, and also includes a lead acid electric storage cell incorporating said positive electrode.

It will be seen from the foregoing, that the invention rather surprisingly dispenses with the known electrochemical route for the preparation of lead dioxide, and relies on the chemical preparation of beta lead dioxide. This choice is counter to the practice of the lead acid battery art, since this art accepts that chemically produced lead dioxide is electrochemically inert. See for example:

(1) Materials Science and Engineering, 28 (1977) pp 167-199, particularly page 187, "Materials and Mechanisms determining performance of Lead-Acid Storage Batteries", by Jeff Perkins, copyright, Elsevier Sequoia SA. Lausanne.

(2) Paper entitled "Different Forms of Lead Dioxide" particularly page 3, by A. C. Simon and S. M. Caulder, presented at the ILZRO Battery Research Meeting, Germany, May 6, 1980.

(3) Journal of the Electrochemical Society Vol 120, No 11, November 1973, pp 1515-1516, particularly page 1516, article entitled "The Hydrogen-Loss Concept of Battery Failure: The $PbO_2$ Electrode", by S. M. Caulder, J. S. Murray, and A. C. Simon.

(4) Journal of the Electrochemical Society, Vol 122, No 4, April 1975, pp 461-466, particularly page 463, article entitled "Structural Transformations of the $PbO_2$ Active Material during Cycling" by A. C. Simon, S. M. Caulder, and J. T. Stemmle.

(5) Journal of Power Sources, 4 (1979) pp 203-213, particularly page 209, copyright, Elsevier Sequoia SA, Lausanne, "Conductivity Measurements on Pure and Mixed Metal Dioxides", by Jean Brenet and Peter Faber.

(6) Journal of Power Sources, 4 (1979) pp 183-190 particularly page 188, copyright, Elsevier Sequoia SA, Lausanne, "Electrochemical Behaviour of Metallic Oxides", by Jean Brenet.

However, notwithstanding the consistent practice of the art to the contrary, positive electrodes made by the method of the invention have been found to possess a significant initial discharge capacity.

BRIEF EXPLANATION OF THE DRAWINGS

The invention will now be further described by way of example only with reference to the accompanying drawings, in which:

FIG. 3 shows a graphical representation of a charge/discharge cycle of the positive electrode of FIG. 1.

DETAILED DESCRIPTION

Figure 1:
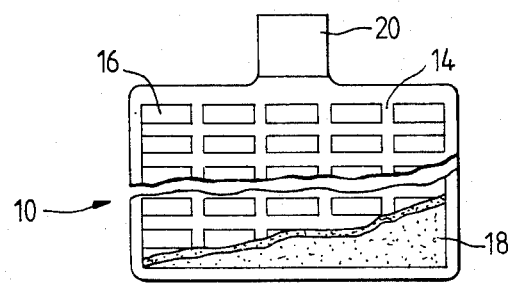
FIG. 1 shows a partly broken-away side view of a representation of a positive electrode for a lead acid electric storage cell.
Figure 2:
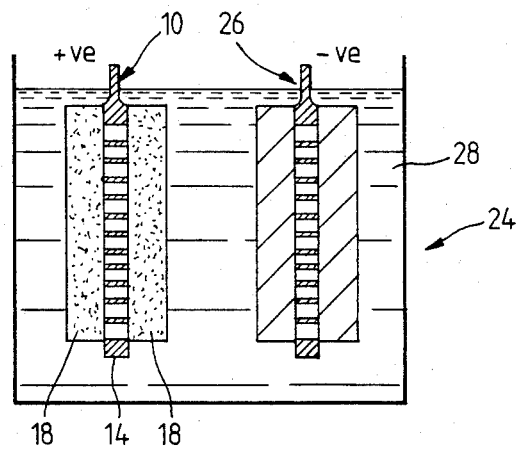
FIG. 2 shows a diagrammatic sectional representation to an enlarged scale of a lead acid electric storage cell including the positive electrode of FIG. 1.

Referring now to FIG. 1, a positive electrode 10 shown, comprises a conventional lead support grid 14 having a multiplicity of rectangular recesses 16 and to both sides of which (only one side is shown in FIG. 1) active material 18 comprising a fibrillated mass of beta lead dioxide and PTFE, in the proportion of 0.2% by weight of PTFE, has been applied. A tab 20 of the support grid 14 provides a terminal for current collection when, as shown in FIG. 2, the positive electrode 10 is incorporated in an electric cell 24 having a spongy lead negative electrode 26 and containing sulphuric acid (e.g. about 3M) as an electrolyte 28.

The active material 18 can be made on the lines suggested by Bagshaw, Clark and Halliwell, J. Appl. Chem. (1966) 16, 180, by suspending red lead (60 grammes) in 5M nitric acid (300 ml) at a temperature of between 80° C. and 100° C., preferably about 95° C. for about 15 minutes, the beta lead dioxide particulate product thereby formed subsequently being filtered and washed with water. The beta lead dioxide is then mixed with about 0.2% by weight of PTFE, and the mixture ground until a fibrillated mass of active material 18 is obtained, the fibrillated active material 18 then being pressed about the sides of the support grid 14 to form the positive electrode 10. Subsequently, in the cell 24 the positive electrode 10 can be discharged for about 20 minutes (e.g. a current of about 5 $mA/cm^2$ of active material 18) and subsequently charged for about 20 minutes (e.g. a current of about 20 $mA/cm^2$ of active material 18). Such a positive electrode 10 has then been found to have a discharge capacity of about 50 mA Hour/gramme of active material 18 (about 26% of the theoretical capacity when discharged at about 10 $mA/cm^2$ of active material 18).

The microstructure of the active material 18 is an important parameter, particularly with respect to the porosity of the active material 18. However, although the invention has been described in relation to a particular composition of an active material 18, alternative proportions might be used, and the constituents might be prepared and mixed together in an alternative manner to that aforedescribed.

We claim:

1. A method of making a lead acid electric storage cell comprising the steps of
   (i) chemically preparing particulate beta lead dioxide;
   (ii) fabricating the beta lead dioxide into an electrode for a lead acid electric storage cell; and
   (iii) assembling a lead acid electric storage cell comprising a positive electrode constituted by said beta lead dioxide electrode, a negative electrode constituted by a second electrode, and an electrolyte for the cell.

2. A method as claimed in claim 1, wherein step (ii) is carried out by mixing the beta lead dioxide with a relatively low proportion of a binder, and applying the mixture to a perforated electrically conductive support structure.

3. A method as claimed in claim 1, wherein the binder comprises polytetrafluoroethylene.

4. A method as claimed in claim 3, wherein the binder is in the proportion of about 0.2% by weight in the mixture.

5. A method as claimed in claim 3, wherein the particulate, beta lead dioxide and the polytetrafluorethylene are ground together to provide a mixture in the form of a fibrillated mass thereof.

6. A method as claimed in claim 1, wherein the beta lead dioxide is prepared by reacting red lead with nitric acid.

7. A method as claimed in claim 1, including subjecting the positive electrode initially to a relatively short electric discharge and subsequently to a relatively short electric charge, to improve the electrical capacity of said positive electrode.

8. A method as claimed in claim 7, wherein the electric discharge comprises a current of about 5 mA per $cm^2$ of the mixture on the support structure for about 20 minutes, and the electric charge comprises a current of about 20 mA per $cm^2$ of the mixture for about 20 minutes.

9. A lead acid electric storage cell comprising a positive electrode comprising chemically prepared particulate beta lead dioxide; a negative electrode; and an electrolyte for the cell.

* * * * *